United States Patent [19]

Straumsnes

[11] 3,824,534
[45] July 16, 1974

[54] GUIDANCE AND INFORMATION SYSTEM FOR MOBILE OBJECTS

[76] Inventor: O. Robert Straumsnes, 18 Walworth Ter., White Plains, N.Y. 10606

[22] Filed: Aug. 12, 1971

[21] Appl. No.: 171,293

[52] U.S. Cl. .................................... 340/24, 35/11
[51] Int. Cl. ............................................ B60r 27/00
[58] Field of Search ..................................... 340/24

[56] References Cited
UNITED STATES PATENTS

| | | | |
|---|---|---|---|
| 1,968,427 | 7/1934 | Sanford | 340/21 |
| 2,501,048 | 3/1950 | Haller | 179/100.1 |
| 2,635,372 | 4/1953 | Field | 340/24 X |
| 2,965,720 | 12/1960 | Bumstead et al. | 179/100.1 |
| 3,483,506 | 12/1969 | Frisch | 340/24 |
| 3,570,445 | 3/1971 | Johnson | 340/24 |
| 3,681,752 | 8/1972 | Cuddihy | 340/24 |

*Primary Examiner*—William C. Cooper
*Attorney, Agent, or Firm*—Irons, Sears & Santorelli

[57] ABSTRACT

A guidance and information system for mobile objects includes an elapsed distance simulator responsive to the actual distance of travel of a mobile object for generating desired control functions at predetermined positions along a known path of travel. The distance simulator comprises a fixed cylindrical drum having a helical track thereon with a scale having gradations corresponding distances, e.g., mileage, along the path of travel. Control elements are selectively positioned along the track at desired, predetermined locations corresponding to predetermined distances along the path of travel of the mobile object, and which elements respectively relate to desired control functions to be generated when the mobile object reaches that predetermined position in its travel. A rotatable cylindrical drum, received concentrically within the first drum, includes a reverse helical path on its surface and is driven in rotation as a function of the distance travelled by the mobile object. A follower is received within the track of the outer drum and engages the reverse helical track of the inner drum so as to traverse the distance track of the outer drum as a function of the distance travelled. Switching means associated with the follower are actuated upon engaging each of the said control elements, thereby to generate electrical control signals which in turn produce the associated, corresponding control functions. The desired control functions are thus produced at the desired, predetermined positions along the path of travel. Exemplary such functions include guidance and traffic control functions, such as related to permissible speed limits, direction of travel and the like, information regarding points of interest along the path of travel, such as resort areas and historical sites, or general information regarding a city being approached along the path of travel, commercial advertisements which may be interspersed among the other message and control functions, or any other desired matters.

21 Claims, 8 Drawing Figures

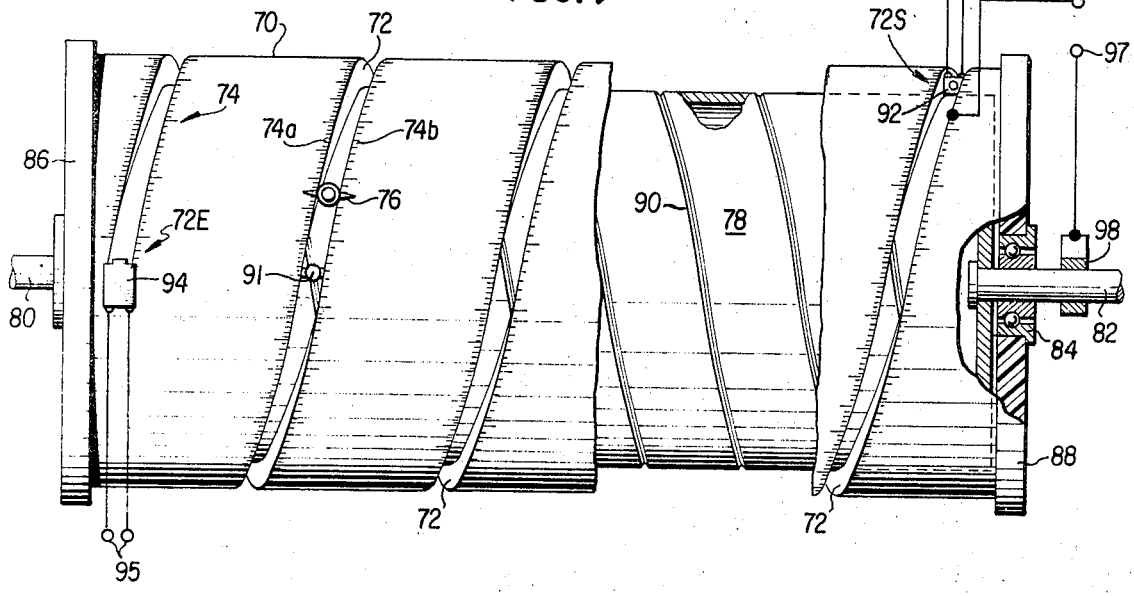
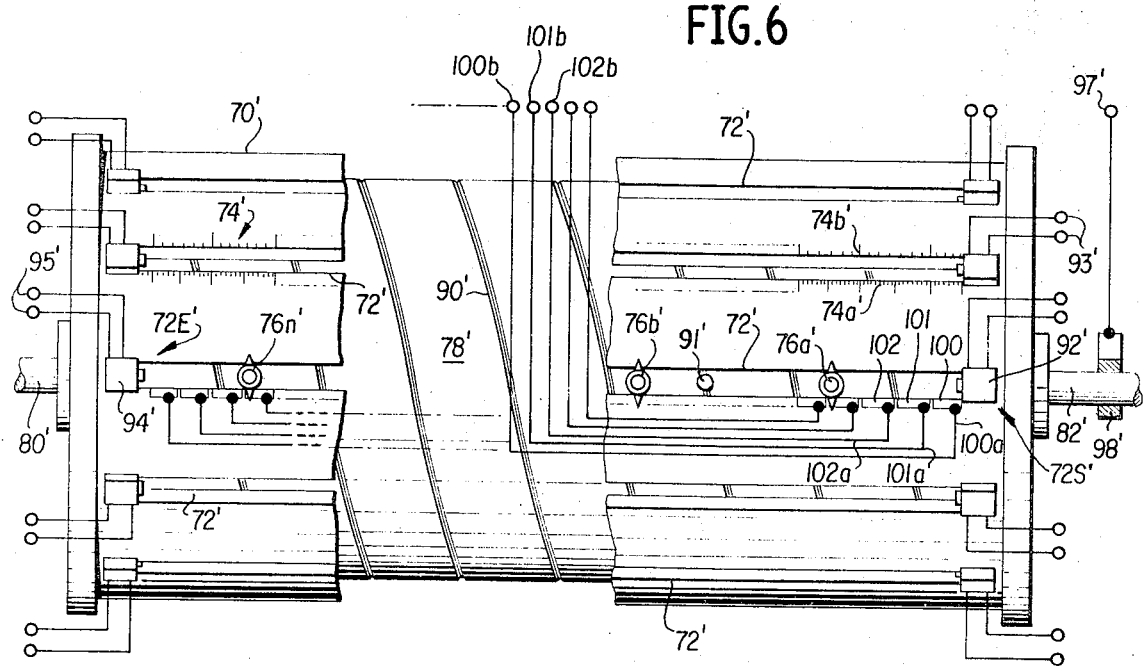

GUIDANCE AND INFORMATION SYSTEM FOR MOBILE OBJECTS

BACKGROUND OF THE INVENTION

1. Field of the Invention

This invention relates to guidance and information systems for mobile objects, and, more particularly, to such a system for producing desired control functions such as guidance and control information at desired positions along a predetermined path of travel.

2. State of the Prior Art

It has been known heretofore in the prior art to provide specific information at predetermined positions along the path of travel of a mobile object, such as any of various typical vehicles adapted for road travel or the like. The most elemental form is the provision of road signs fixed in position along a highway which provide such information. Increasing congestion on highways, the complexity of the highway system, and an interest in preventing unsightly cluttering of the highways with excessive numbers of signs have generated a desire to afford other forms of conveying information of the described types to the operator and passengers in such vehicles. More significantly, the basic technique of fixed roadside signs is undesirable since visual observation thereof by the operator of the vehicle distracts his attention from his primary function of driving. Further, significant traffic control indications such as for speed limit zones and the like may be overlooked by the operator, introducing a hazard to other users of the highway. In addition, directions provided by such signs are necessarily very brief and typically do not fully advise the operator. Furthermore, interesting, but not essential, information typically cannot be provided in any manner by fixed roadside signs for observation from a moving vehicle, such as general information relating to points of interest along the path of travel.

Accordingly, numerous techniques have been developed in the prior art in an effort to afford greater information and control functions with regard to mobile objects such as typical highway vehicles. Many such prior art systems require that suitable indicating elements be positioned at selected intervals along the path of travel to identify the geographic location or position of a vehicle and thus the distance along a desired path of travel. Vehicles suitably equipped with sensing means for detecting these indicating elements then may communicate through a suitable transmitter with a central station for identifying the position of the vehicle and, in turn, the central station can generate various control functions related thereto.

These and other systems of the prior art are exceedingly complex and expensive and yet have failed to provide to the operator of a vehicle the variety of information as is desirable and as previously noted.

The system of the invention overcomes these and other defects of the prior art and provides at low cost a wide variety of information which can be selectively and automatically produced at predetermined positions along the path of travel of a mobile object.

SUMMARY OF THE INVENTION

The present invention affords a self-contained system for use in mobile objects, such as a vehicle adapted for highway travel, for producing desired control functions as to vehicle guidance and traffic control, as well as a variety of other information, at predetermined and desired positions along a known path of travel of the vehicle. More particularly, the system of the invention includes an elapsed distance simulator having a track thereon with suitable gradations corresponding to predetermined distances along a path of travel of a vehicle. The simulator is driven by means, such as an odometer, responsive to the actual distance travelled by the vehicle. The simulator includes control elements selectively positioned along the distance track for generating corresponding, desired control functions as predetermined positions are reached along the path of travel. These control functions may include, variously, warnings as to speed zones, traffic directions such as on complex highways to indicate exits and the like, general information relating to points of interest along the path of travel and the like.

More specifically, the simulator comprises a cylindrical drum fixed in position and having a helical track thereon with gradations along the track corresponding to distance measurements along the path of travel. A rotatable cylindrical drum is received in concentric relationship within the distance drum and includes a reverse helical path, the interior drum being driven in rotation as a function of the distance actually travelled by the vehicle. A follower is received in the track of the distance, outer drum, and engages the reverse helical track of the inner drum to traverse the track of the outer drum as a function of the distance travelled by the vehicle.

Control elements are positionable along the track of the outer drum at selected locations corresponding to the locations along the actual path of travel at which desired control functions are to be generated. As the follower element traverses the track of the distance drum, it is actuated by the control elements to produce an electrical output signal, which in turn generates the desired control and indication functions. Accordingly, the system further includes various output devices contained within the vehicle, such as indicator lamps which may provide warning signals and the like, and prerecorded tape messages which may be automatically actuated for reproduction in response to these control signals.

BRIEF DESCRIPTION OF THE DRAWINGS

FIG. 5 shows a first embodiment of a simulator for use in the system of the invention;

FIG. 6 shows a second embodiment of a simulator for use in the system of the invention;

DETAILED DESCRIPTION OF THE INVENTION

Figure 1:
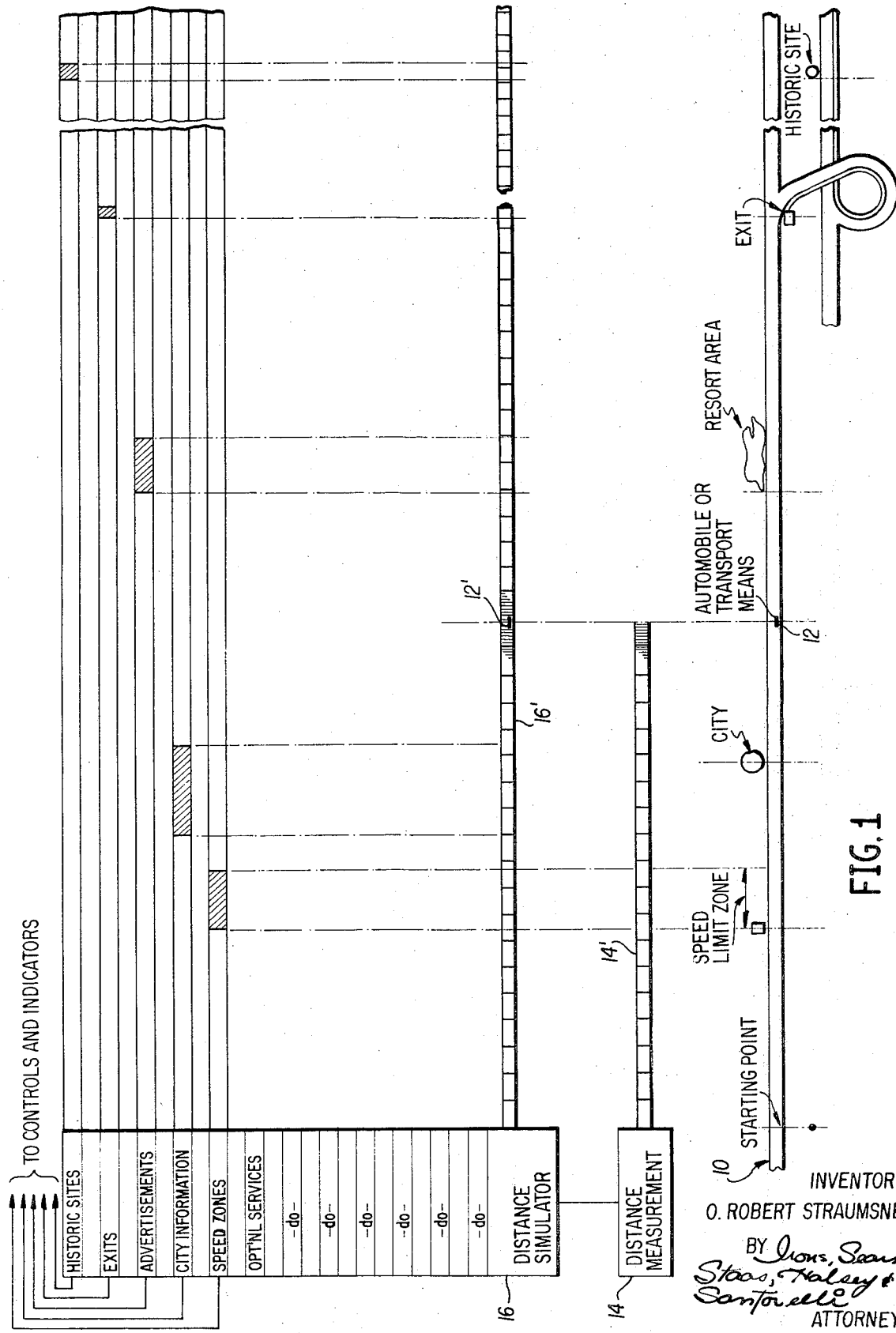
FIG. 1 is a diagram illustrating the functional relationship of the guidance and information system of the invention with respect to a known, predetermined path of travel of a mobile object, such as a vehicle adapted for highway travel.

In FIG. 1 is shown a diagram illustrating the functional relationship of the guidance and information system of the invention with respect to a known, predetermined path of travel of a mobile object such as a vehicle adapted for highway travel. The actual path of travel, such as a highway, is illustrated at 10 and various items as to which information is to be provided along that path of travel 10 are identified by corresponding labelling in FIG. 1. For example, at known displaced positions along the highway 10 there are illustrated indications as to speed limit zones, information concerning a city being approached, a resort area adjacent thereto, and an exit from the highway to a different highway which later passes a historical site. The vehicle travelling along the highway 10 is shown at 12, midway of its length.

A distance measurement means 14 which may comprise the odometer of a typical automobile affords a measurement identifying the position at any time of the vehicle 12 relative to a starting point, that measurement being graphically illustrated at 14' in FIG. 1. The distance measurement afforded by means 14 is provided to an distance simulator 16. In a manner to be explained, the simulator 16 affords a simulated path of travel illustrated at 16' which effectively is made to correspond to the actual, predetermined path of travel 10. The simulator 16 responds to an output from the odometer 14 to identify the position of the vehicle 12 along that simulated path 16' as illustrated in FIG. 1.

The simulator 16 also includes means for storing information preset therein regarding the actual path of travel, and for automatically generating outputs for activation of various controls and indicators as the vehicle 12 proceeds along the path of travel and, correspondingly, the position of the vehicle along the simulated path of travel 16' is identified and recognized by the simulator 16. As an example, the location of a speed limit zone along the highway 10 is preset into the simulator 16 at the corresponding simulated distance. An output identifying that speed limit zone is generated automatically as the vehicle 12 proceeds therethrough and, correspondingly, the simulated vehicle 12' proceeds through that corresponding distance in the simulated path of travel 16'. Similarly, where it is desired to provide advance information regarding a city being approached, a location in advance of the city at which reproduction of that information is to be initiated is preset into the simulator 16. Likewise, the locations at which information, such as an advertisement, regarding a resort area, regarding guidance or travel directions, and regarding points of interest, such as historical sites, are preset into the simulator for automatic generation of controls for reproduction of that information as those corresponding places are approached or passed by the vehicle.

Figure 2:
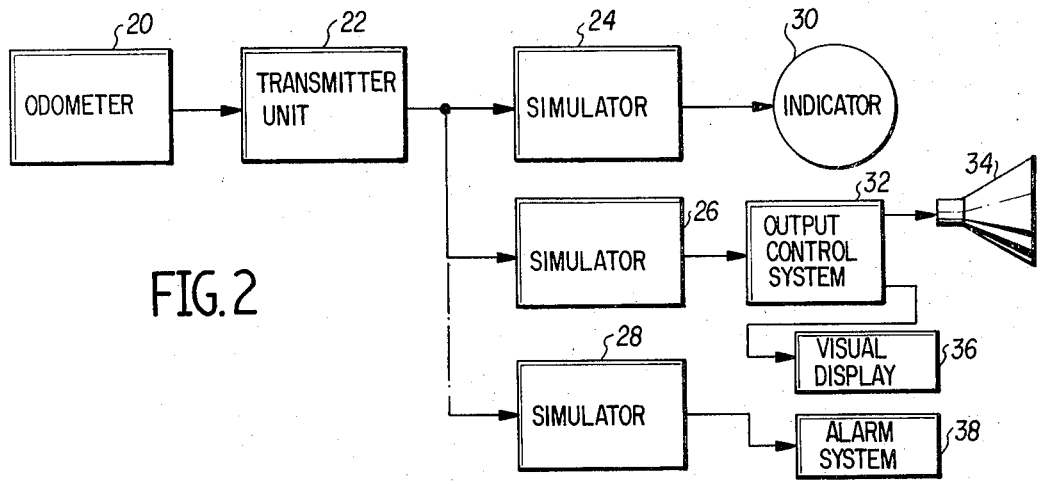
FIG. 2 is a block diagram of the guidance and information system of the invention.

The block diagram of FIG. 2 shows in greater detail the operating components of the system of the invention. The distance measurement means 14 of FIG. 1 is shown specifically as an odometer 20, the output of which is coupled or transmitted by a transmitter unit 22 to each of a plurality of simulators 24, 26 . . . 28. As later explained, a relatively simplified simulator structure may afford but a single output function and hence the provision of plural functions requires a corresponding plurality of simulators. Conversely, a more complex simulator embodiment may afford a number of independent control outputs or functions from a single physical structure. Accordingly, the diagram in FIG. 2 is to be understood as representing these plurality of functions for any of such structural embodiments of the simulators as employed in the system of the invention.

The transmitter unit 22 serves the function of transmitting an indication of the distance actually travelled by the vehicle to each of the simulators 24, 26 and 28 in accordance with a first embodiment in which a plurality thereof are provided, or with a second embodiment in which a single simulator having plural functional control outputs is provided.

Examples of the various control and indication functions afforded by the system of the invention are likewise illustrated in FIG. 2. For example, simulator 24 may activate an indicator 30 which may be a visual numerical display device serving to automatically display the particular speed limit of a speed zone being approached and passed through by the vehicle. Simulator 26 similarly may activate an output control system 32 providing more complex functions. Illustratively, system 32 may be a magnetic tape control device which is automatically energized upon each output from simulator 26 to reproduce an audio message through speaker 34 and, as well, activate a visual display 36 such as a slide projector or the like. Verbal information regarding a city, such as statistics, traffic directions, points of interest therein and the like may thus be provided and the visual display 36 may provide corresponding information relating to the city. Preferably, the tape system includes pre-recorded controls which provide for automatic start/stop operations of the tape upon completion of each message. Accordingly, a succession of outputs from simulator 26 may generate a corresponding succession of control functions by the system 32, each such function being generated at the desired locations as the vehicle travels along the predetermined path. As a further example, simulator 28 may activate an alarm system 38 which may include buzzer or warning light outputs indicating dangerous conditions along the path of travel, such as highway construction, dangerous intersections, and the like. Again, the same warning output may be produced at each such dangerous location, or a plural function simulator may be employed, providing different warning outputs corresponding to the nature of the danger presented.

Figure 3:
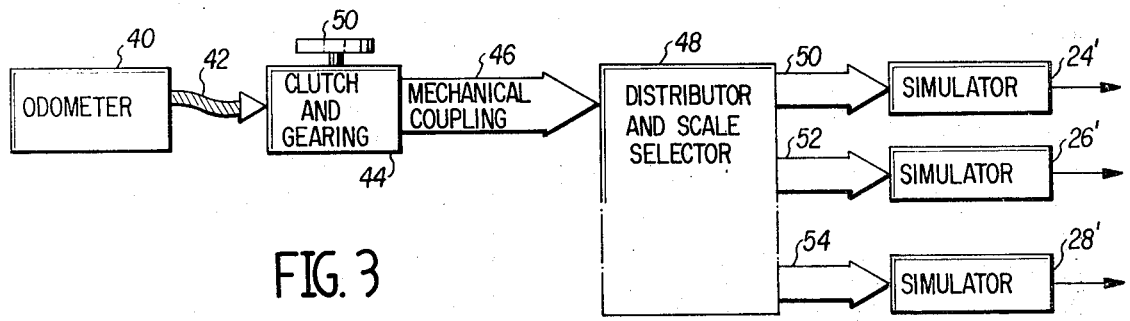
FIG. 3 is a more detailed block diagram of a portion of the system of the invention as shown in FIG. 2 in accordance with a first embodiment thereof.

The block diagram of FIG. 3 shows in some further detail a portion of the overall system of the invention of FIG. 2 in accordance with a first specific embodiment. Specifically, an odometer 40, which may be of conventional type as afforded in vehicles and which advances as a function of distance travelled, transmits a mechanical signal proportional to the elasped distance, by means of flexible cable 42, to a clutch and gearing system 44. The system 44, incorporating a clutch and gearing arrangement of a type readily apparent to those skilled in the art, permits selective control of transmission of the rotational movement signal from cable 42 for supply through a mechanical coupling 46 to a distributor and scale selector means 48. The gearing, for a purpose to be described, may provide direct connection of the cable 42 and coupling 46 or step-down or step-up ratios with respect to the mechanical signal supplied through coupling 46 to the distributor and scale selector 48. Also for a purpose to be discussed, manual control 50 associated with the clutch and gearing system 44 may be actuated, such as by vertical displacement thereof, for manual rotation thereby to actuate coupling 46 in a reverse rotational direction, relative to that direction in which it is normally rotated in response to the mechanical signal provided through cable 42. As later described, this function permits resetting of the simulators upon completion of the predetermined path of travel by the vehicle in question.

The distributor and scale selector 48 similarly may comprise a gear box arrangement for supplying a plurality of mechanical output signals through mechanical couplings 50, 52 and 54 to respectively associated simulators, such as 24', 26' and 28', corresponding to the similarly numbered simulators of FIG. 2. The system 48, of course, may provide as many outputs as desired and may provide for selection of some or all of the outputs in accordance with the number and type of functions desired. The system 48 also may include gears which are selectively engaged to provide outputs of different rates through the couplings for accommodating different characteristics or functional requirements of the selected simulators.

It is to be appreciated that the mechanical coupling elements illustrated in FIG. 3 are merely illustrative and that any suitable coupling and/or transmitting means may be employed in the alternative. As an example of available alternatives, reference is had to the block diagram of FIG. 4 which illustrates an alternative electromechanical embodiment of this portion of the system.

Figure 4:
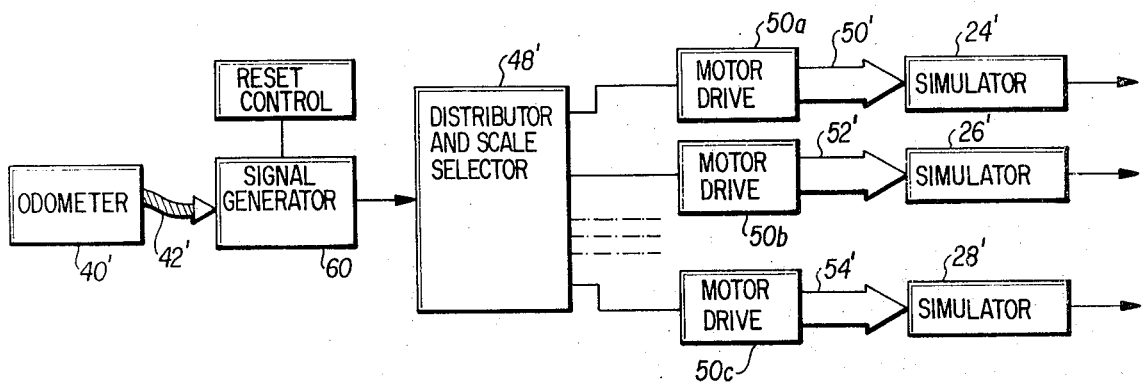
FIG. 4 is a more detailed block diagram of a portion of the system of the invention as shown in FIG. 2 in accordance with a second embodiment thereof.

In FIG. 4, and identifying like elements by identical but primed numerals, odometers 40' transmits a signal through cable 42' to an electrical signal generator 60, the output of which is proportional to the elapsed distance travelled by the vehicle. For example, the generator 60 may comprise a pulse generator, the number of pulses, and/or the repetition rate of the pulse train produced thereby being in direct proportion to the elapsed distance and/or the speed of travel, respectively. The generator 60 might comprise instead a counter producing a parallel BCD code output in accordance with predetermined increments of elapsed distance actually travelled. Those skilled in the art readily will appreciate that a variety of means for generating such representative electrical signal outputs proportional to the distance travelled are available for employment herein.

The distributor and scale selector 48' in the embodiment of FIG. 4 performs identical functions to the corresponding element 48 in FIG. 3, albeit as an electrical equivalent of those mechanical functions. Thus, the unit 48' includes a plurality of outputs which may be selectively energized in response to the input signal from generator 60, and which may be in direct proportion or in any desired proportional relationship to that input signal. Preferably, in the electromechanical embodiment of FIG. 4, the output signals from system 48' serve to energize motor drives 50a, 50b and 50c for driving their associated simulators 24', 26' and 28' through the respectively corresponding couplings 50', 52' and 54' at rates as defined by the corresponding outputs from the unit 48'. As noted before and explained hereafter, there may be employed a plurality of individual simulators having individual drive motors adapted to be driven in parallel, as shown in FIG. 4, or, in the alternative, a unitary simulator having a plurality of selective outputs and which is driven from a single motor drive.

In FIG. 5 is shown a first embodiment of a simulator for use in the system of the invention. The simulator includes a first, outer drum 70 having formed in the surface thereof a helical track 72 extending through the thickness of the cylindrical side walls of the drum. A scale 74 comprising graduations extending along the track 72 may be suitably labelled to identify the distance travelled. As an example of the scale selection, a first scale 74a may correspond to only one half of the simulated elapsed distance as the scale 74b and the gradations provided along the scales are correspondingly spaced and labelled. A control element 76 is selectively positionable along the length of the track 72 to produce a control output at a predetermined position along the path of travel, by positioning that element 76 at the simulated distance identified by the appropriate scale associated with the track 72.

A rotatable drum 78 is received concentrically within the outer drum 70 and mounted therewithin for rotation, such as by axles 80 and 82 received in bearing structures 84 through end plates 86 and 88 fixedly secured to the drum 70. For this purpose, the drum 78 may be driven in rotation by a suitable mechanical connection to axle 82 in accordance with any of the driving means hereinbefore described. The end plates 88 may be secured to the drum 70 to complete the assembly in any suitable fashion and may include mounting brackets (not shown) to mount the simulator to a stable surface on the vehicle.

The drum 78 preferably is formed of an electrically conducting material or includes an electrical conducting surface provided on an interior cylindrical supporting structure which may be of an insulating material. The drum 78 furthermore has formed on its surface a continuous helical track 90 adapted to receive a follower element 92 which furthermore is confined to be driven through the track 72 of the outer drum 70 as a function of rotation of the interior drum 78. As is apparent, one end of the track 72 is selected as the beginning point and the element 91 is caused to be positioned at that beginning or start position when the vehicle is at the starting point of the path of travel.

As the follower 91 proceeds through track 72 and engages control element 76, an electrical output signal is produced to identify the arrival of the vehicle as that predetermined position along a known path of travel. This, of course, implies rotation of the drum 78 at the appropriate speed for the distance scale which has been selected.

The starting point of the track 72, for example, is selected to be that end labelled 72S and the end of the track to be that end labelled 72E. Microswitches 92 and 94 are respectively associated with those starting and end points and are adapted to be engaged by the element 91 at those extreme positions to produce electrical output signals for a purpose to be described. Output leads 93 and 95 for the switches 92 and 94, respectively, are schematically indicated. Furthermore, in a manner to be described, an electrical output signal is provided on the output leads 96 and 97 when the follower 91 engages the control element 76.

In an embodiment in which the drum 78 is a conductor or has a conducting surface, the electrical output may be derived through a brush contact 98 engaging the metal driveshaft 82 electrically connected to the conducting surface of the drum 78. The control element 76 includes electrical switch means, to be described, and which are actuated by the follower 92 to complete a circuit to the other output terminal 96.

In the embodiment of FIG. 5, there is illustrated only the single pair of outputs terminals 96 and 97 at which an output signal is produced. However, a number of control elements 96 may be positioned in the track 72 at desired positions. As the follower 92 engages each such element 76, corresponding output signals are then produced at the terminals 96 and 97.

Before considering the specific construction details by which the electrical switching function is performed in the structure of FIG. 5, attention is first directed to an alternative simulator embodiment shown in FIG. 6. Identifying corresponding elements by identical but primed numerals, an outer drum 70' includes a plurality of axially extending tracks 72' each having one or more distance scales assocated therewith for the purpose above noted. In this embodiment, each of the plurality of tracks 72' includes an identical set of distance scales. Since all of the tracks 72' may be identical, reference is had only to the single such track illustrated in detail. A number of control elements 76a', 76b' ... are selectively positioned along the track 72' in accordance with control functions desired to be generated at the corresponding simulated elapsed distances. Although a common conductor system as employed in FIG. 5 and described in more detail hereafter may be employed in the bodiment of FIG. 6, an alternative conductor system permitting a plurality of separately identifiable outputs from each track is instead shown in FIG. 6. Particularly, a number of individual conductor segments 100, 101, 102 ... is displaced along the track 72' with an insulated space between the adjacent ends thereof. Output leads 100a, 101a, 102a ... are connected to those corresponding elements and provide electrical connection to respectively corresponding output terminals 100b, 101b, 101c .... Each of the elements 100, 101 ... may correspond to a short distance such as 2 miles along the path of travel permitting thereby a separately identifiable control output which may be selectively produced at any desired position along that two-mile segment. The conductors may be suitably plated on the insulated surface of the outer drum 70', affording in a convenient and economical manner the provision of a large number of such conductors.

Consideration is now given to the specific construction of the selectively positionable control elements and associated followers which may be utilized in either of the illustrative embodiments of the simulator in accordance with FIGS. 5 and 6. Considering first FIG. 7, the rotatable drum 78 including a helical track 90 therein is there illustrated, adapted for rotation within the outer drum 70, the latter including a track 72. The track 72 includes on its opposite interior walls a pair of recesses 110 and a second pair 112. These recesses extend along the length of the track 72. The upper interior surface 110a of the recesses 110 includes a conductor 114 secured therein, one or the other, or both of which, are electrically connected to the output terminal 96 corresponding to the terminal 96 in FIG. 5. The control element 76 includes a slide element 116 configured to be received within the track 72 and to ride along the outer surface of drum 70. An actuator 118 includes a shank 119 extending through an aperture 120 in the slide element 116 and carrying a knob 122 at its upper end adapted for grasping by hand an electrical contact plate 124 at its lower end. Spring 126 biases the actuator 118 to the upper position as shown causing contact plate 124 to engage the contact elements 114.

The follower 92 includes a flat disc-like element 130 received in sliding and rotational engagement within the pair of recesses 112 and carrying a cylindrical pin 132 having a pointed end 132a adapted to be received in the helical track 90. A spring 134 is carried on the upper end of pin 132 and is resiliently biased normally to extend above the lower level of contact plates 124.

In operation, rotation of drum 78 imparts a force to pin 132 driving it along the track 72, the latter being free to move by virtue of the arrangement of disc 130 and the pair of grooves 112. Preferably, pin 132 is free to rotate within the disc 130 to facilitate this movement. Upon engaging control element 76, the spring 134 is deflected as illustrated providing good electrical contact to the contact plate 124. Accordingly, an electrical conduit is completed from the terminal 97 to which drum 78 is electrically connected, through pin 132 and spring 134 to the plate 124, contact element 114 and the other output terminal 96. It will be readily appreciated that only one of the contact elements 114 is required to complete this circuit.

Figure 7:
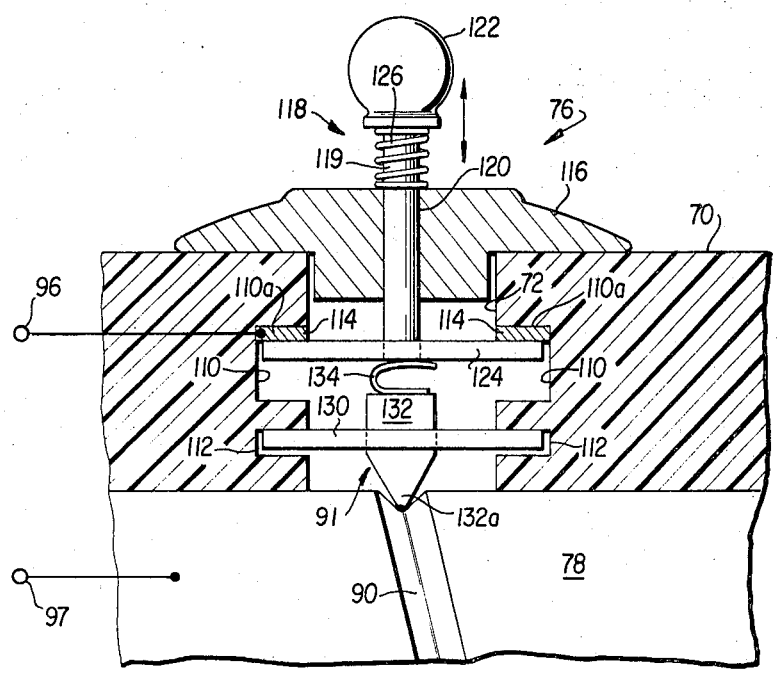
FIG. 7 is an enlarged, cross-sectional view of a portion of a simulator in accordance with either of FIGS. 5 and 6, illustrating details of a first embodiment of a control element utilized therein.
Figure 8:
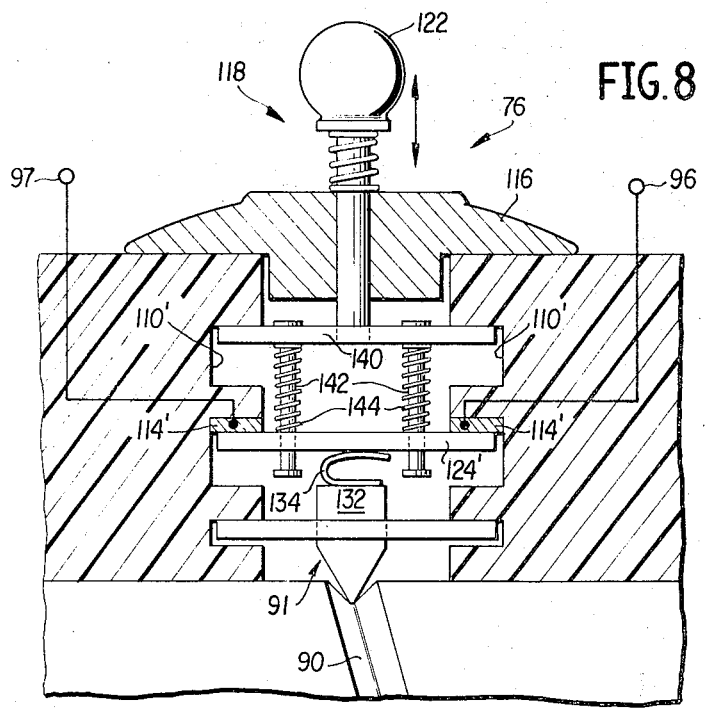
FIG. 8 is an enlarged, cross-sectional view of a portion of a simulator in accordance with either of FIGS. 5 and 6, illustrating details of a second embodiment of a control element utilized therein.

In FIG. 8 is shown an alternative embodiment of a control element and wherein an identical follower 92 as shown in FIG. 7 is employed. In this embodiment, the electrical circuit is completed without use of the drum 78 and hence the latter need not be of conducting material.

The control element 76 again includes a slide element 116 having spring biased actuator 118 carrying a support plate 140. Plate 140 is received at its opposite ends in a pair of recesses 110'.

Contact plate 124' is suspended from plate 140 by rods 142 and normally spring biased into the lower position illustrated by concentric coil springs 144, the enlarged lower ends of rods 142 limiting the downward movement. The plate 124' is thus normally spaced from the contact elements 114'. As is apparent, downward depression of actuator 118 permits adjustment of the control element 76 along the track 72 and release thereof clamps the control element 76 in the desired position. As the follower 92 reaches the position of the actuator 76, spring 134 engages contact plate 124' raising it to a level for engaging the contact elements 114' and completing an electrical connection between the terminals 96 and 97.

Accordingly, the control elements in the illustrative embodiments above discussed provide for generating an electrical signal at the instant that the follower being driven along the track engages the control element. In the case of FIG. 7, that signal is generated in a circuit including the rotating drum 78, whereas in FIG. 8, as illustrated, the circuit is completed through the contact plate 124' and the contact elements 114' to the exterior terminals. In FIG. 8, it will, of course, be apparent that the electrical path as established in FIG. 7 may be employed in the alternative. It will be readily appreciated either of the devices of FIGS. 7 and 8 may be employed in either of the simulators of FIGS. 5 and 6. Whereas the simulators have been disclosed in conjunction with an electrical circuit as in FIG. 7, the modification in accordance with the control element of FIG. 8 will be readily apparent. Specifically, two output leads each respectively connected to the elements 114, or 114′, will be provided.

The follower also may engage the microswitches 92 and 94 thereby to provide output signals on the terminals 93 and 95, respectively, indicating the position of the follower at the beginning and end of the track. These output signals may be desirable in the mechanical drive arrangement of FIG. 3, such as to automatically disconnect the gearing and clutch arrangement to terminate further drive of the simulator and, as well, to provide an indication upon resetting of the simulator by reverse rotation that the follower is at the beginning of the track when setting the simulator at the beginning of a journey. Similarly, in the electrical control system embodiment of FIG. 4, the end signal may provide automatic reversal of rotation to reset the simulator and thus correspond to the reset control function associated with signal generator 60 in FIG. 4. As well, the start of path signal may terminate the reverse drive and indicate that the simulator is now set for the beginning of the journey.

In summary, the system of the invention provides for simulating a known path of travel and automatically generating various control functions at precise, predetermined locations along the actual path of travel. The simulator may be of complex or simple construction, as illustrated in FIGS. 5 and 6, respectively, and may be employed individually or in combination. An individual control output or a plurality of identical control outputs may be derived along the simulated path, the time displacement of the plurality of outputs affording the generation of typically the same control function at each of those locations. Alternatively, a more complex conductor arrangement as in FIG. 6 may be employed, permitting separately identifiable control outputs along various segments of the simulated path thereby permitting automatic generation of a number of different control functions along a single simulator track. Further, as shown in FIG. 6, a plurality of tracks may be afforded in a single simulator and each thereof may afford automatic generation of different control outputs even where each such track employs a continuous contact structure instead of the segmented contact structure as shown in FIG. 5.

It will be readily apparent to those skilled in the art that numerous modifications and adaptations of the system of the invention may be afforded, examples of which have been provided hereinabove, and thus it is intended by the appended claims to cover all such modifications and adaptations as fall within the true spirit and scope of the invention.

What is claimed is:

1. A guidance and information system for mobile objects travelling along a known predetermined path for automatically providing control functions at a predetermined location along said known predetermined path of travel of a mobile object as a function of distance travelled by said mobile objects comprising:

distance simulator means transported by the mobile object having a scale simulating said predetermined path of travel thereof, a control element associated with said distance simulator means and selectively positionable along the scale in relation to the simulated path of travel at a position corresponding to a predetermined location along the actual path of travel at which a control function is to be produced, means responsive to actual distance travelled by said mobile object and adjustable to be positioned along said scale at a point corresponding to the actual position of said mobile object along said known predetermined path and to correspondingly traverse said simulated path of said distance simulator means and to engage said control element upon attaining the position thereof along said simulated path, said control element producing a control output upon being engaged by said traversing means, and utilization means associated with said control element and responsive to said control output therefrom to generate a desired control function.

2. A guidance and information system as recited in claim 1, wherein said traversing means comprises:

a follower element adapted to advance along the simulated distance path of said distance simulator means, an odometer responsive to the distance travelled by the mobile object and generating a signal proportional thereto, and means responsive to the signal generated by said odometer for advancing said follower element.

3. A system as recited in claim 2, wherein said simulated distance path of said distance simulator means includes start and end positions, and said advancing means includes operable to position said follower element at said start position.

4. A system as recited in claim 3, wherein there is further provided switch means at said start and end positions engageable by said follower element to generate start and end signals, respectively.

5. A system as recited in claim 4, wherein said positioning means of said advancing means is responsive to an end signal to return the follower element from the end position to the start position and is responsive to the start signal thereupon generated by said switching means to terminate the return movement of the follower element.

6. A system as recited in claim 2, wherein said simulator includes at least two scales of different scale values, and said advancing means is adjustable to advance said follower element at a rate in proportion to a selected one of said scales in response to the signal generated by said odometer.

7. A system as recited in claim 6, wherein a plurality of control elements are selectively positioned along a given simulated path of travel of said distance simulator means for generating a corresponding plurality of control outputs as said control elements are engaged individually and in succession by said traversing means, and said utilization means generates said desired control function in response to each said control output.

8. A system as recited in claim 1, wherein said utilization means comprises a visual indicating means enabled in response to said control output to produce a predetermined visual indication.

9. A system as recited in claim 1, wherein said utilization means comprises information reproducing means for reproducing a predetermined recorded message in response to said control output.

10. A system as recited in claim 1, wherein said reproducing means comprises a magnetic tape system having pre-recorded start and stop controls defining a sequence of messages recorded thereon,
a plurality of said control elements are selectively positioned along the simulated distance path of said simulator means and respectively produce control outputs in succession as said plurality of control elements are engaged by said traversing means, and said reproducing means reproduces the plurality of messages in succession in accordance with the start and stop controls in response to the succession of control outputs.

11. A system as recited in claim 1, wherein said distance simulator includes a plurality of simulated paths of travel each having associated therewith a control element selectively positionable along the associated simulated paths of travel,
said traversing means simultaneously traverses said plural simulated paths of travel thereby to produce a control output upon engaging each such control element for each such simulated path, and
said utilization means includes a plurality of utilization means respectively associated with predetermined ones of said pluraltiy of simulated paths.

12. A system as recited in claim 1, wherein said distance simulator means includes contact means disposed along the simulated path of travel for defining incremental sections thereof for producing separately identifiable control outputs from said plurality of contact means in accordance with a control element positioned along said path and engaging one of said contact elements.

13. In a guidance and information system for mobile objects for automatically providing control outputs at a predetermined location along a known predetermined path of travel of the mobile object as a function of the actual distance travelled by said mobile object, a distance simulator comprising:
means defining a track and an associated distance scale simulating actual distance along an actual path of travel of said object,
an adjustable follower element adjustable to be positioned on said track to a point on said simulated distance scale corresponding to the actual position of said mobile object on the known predetermined path of travel,
drive means responsive to movement of said mobile object for advancing said follower element along said track as a function of the actual distance travelled by said mobile object and in relation to the simulated distance scale, and
control means selectively positionable along the simulated distance track at a position along the simulated distance scale corresponding to said predetermined location and engaged by said follower element to produce a control output as the mobile object reaches that predetermined location along the actual path of travel.

14. A distance simulator as recited in claim 13, wherein
said track defining means comprises a cylindrical drum having a track extending radially through the side walls of the drum and from a first to a second end thereof, said drive means comprises a further cylindrical drum received within said first drum in coaxial and rotatable relationship therewith and said further drum includes a helical drive path formed in the outer surface thereof, and
said follower element is received for movement in said track of said first drum and engages said helical path of said further drum such that by rotation of said further drum said follower element is advanced through said track of said first drum.

15. A system as recited in claim 14, wherein
said first drum includes electrical contact means disposed along said track and engaged by said control means when positioned at a desired position on said track, said control means completing an electrical circuit with said contact means when engaged by said follower element to provide an electrical control output.

16. A system as recited in claim 15, wherein said further drum includes an electrically conducting surface, said follower element is an electrical conductor, and
said electrical circuit includes said drum, said follower element, said control means and said electrical contact means of said drum.

17. A system as recited in claim 14, wherein
said first drum includes a pair of electrical contact means disposed along opposite sides of said track, and
said control element includes an electrical switch element normally displaced from said contact means and urged against said pair of contact elements when said control means is engaged by said follower thereby to complete an electrical circuit between said pair of contact elements and provide a control output.

18. A simulator as recited in claim 14, wherein said track is formed in a helical pattern in said first drum.

19. A simulator as recited in claim 14, wherein said first drum includes a plurality of generally longitudinally extending tracks disposed about the circumference thereof, each said track receiving a corresponding follower element engaging a corresponding helical path of said further drum, said follower elements being driven simultaneously along said respectively corresponding tracks.

20. A simulator as recited in claim 19, wherein each of said tracks has contact means respectively associated therewith for producing separately identifiable control outputs as to each of said plurality of tracks.

21. A simulator as recited in claim 14, wherein said electrical contact means is provided as a pluraltiy of separate insulated contact elements providing corresponding, separately identifiable control outputs and corresponding to incremental distances along the simulated distance scale.

* * * * *